US006626208B2

United States Patent
Chen

(12) United States Patent
(10) Patent No.: US 6,626,208 B2
(45) Date of Patent: Sep. 30, 2003

(54) CHECK VALVE FOR USE IN A PRESSURE BALANCE FAUCET

(75) Inventor: Mei-Li Chen, Taichung Hsien (TW)

(73) Assignee: Kuching International Ltd., Taichung Hsien (TW)

( * ) Notice: Subject to any disclaimer, the term of this patent is extended or adjusted under 35 U.S.C. 154(b) by 66 days.

(21) Appl. No.: 10/028,819

(22) Filed: Dec. 28, 2001

(65) Prior Publication Data

US 2003/0121552 A1 Jul. 3, 2003

(51) Int. Cl.[7] .............................................. F16K 11/074
(52) U.S. Cl. .................... 137/625.4; 137/100
(58) Field of Search .............................. 137/100, 625.4

(56) References Cited

U.S. PATENT DOCUMENTS

| | | | | |
|---|---|---|---|---|
| 4,314,673 A | * | 2/1982 | Rudelick | 137/597 |
| 4,457,452 A | * | 7/1984 | Symmons | 222/20 |
| 4,750,519 A | * | 6/1988 | Chao-Chun | 137/625.17 |
| 5,492,149 A | * | 2/1996 | Loscheder | 137/625.4 |
| 5,725,010 A | * | 3/1998 | Marty et al. | 137/100 |
| 6,021,952 A | * | 2/2000 | Antoniello et al. | 236/12.16 |
| 6,109,288 A | * | 8/2000 | Al-Hamlan | 137/87.01 |

* cited by examiner

*Primary Examiner*—John Fox
(74) *Attorney, Agent, or Firm*—Troxell Law Office PLLC

(57) ABSTRACT

A check valve for use in a pressure balance faucet. It is mainly made up of a control valve body, a check valve block, a pair of positioning pins, two seal rings, a pair check valve sets and a valve mount. The check valve sets are secured to the check valve block which is housed between the control valve body and the valve mount that are in threaded engagement with each other. As the valve sets are worn out, they can be easily and quickly replaced by first dismantling the control valve body from the valve mount and then the check valve block being picked out by pincers to get the valve sets replaced with ease, speed in a DIY manner.

1 Claim, 4 Drawing Sheets

CHECK VALVE FOR USE IN A PRESSURE BALANCE FAUCET

BACKGROUND OF THE INVENTION

The present invention relates to an improved check valve for use in a pressure balance faucet. It is mainly made up of a control valve body, a check valve block, a pair of positioning pins, two seal rings, a pair check valve sets and a valve mount. The check valve sets are secured to the check valve block which is housed between the check valve body and the valve mount that are in threaded engagement with each other. As the valve sets are worn out, they can be easily and quickly replaced by first dismantling the control valve body from the valve mount and then the check valve block being picked out by pincers to get the valve sets replaced with ease, speed in a DIY manner.

Referring to FIG. 1, a conventional check valve for use in a faucet is mainly made up of a valve body 10 and a pair of check valve sets 20. The valve body 10 is a hollow housing with a water discharge control handle at the top and is equipped with a hot and cold water pipeline connector 11 at the right and left side of its bottom. The connectors 11 are provided with inner threads 12 respectively. To the top and bottom of the valve body 10 is symmetrically coupled a water outlet duct 13. Each check valve set 20 has a connecting pipe 21 and a check valve 22. The connecting pipe 21 is hollow tube and has an externally threaded section 212 at each end. The check valve 22 has a hollow mounting seat 221 which is provided with a through hole 222 at the center of one end with a plurality of ribs outside the through hole. A spiral spring 223 is disposed in alignment with the through hole 222 and has a valve rod 224 engaged with the center thereof and led through the through hole 222. The valve rod 224 has one large step-like end to prevent the same from disengaging from the mounting seat 221 which is wrapped with a sleeve 225. Inside the sleeve 225 the mounting seat 221 can be rotated. A seal ring 226 is attached to the right end of the sleeve 225.

Such a prior art check valve structure has a following disadvantage in use: The mounting seat 221, sleeve 225 and seal ring 226 are made of rubber or plastics, and they will become hardened or shrunk after long period of use. The check valves 22 are easily out of function as the spring 224 is in fatigue. The check valves 22 of the check valve sets 20 must be replaced with the wall 30 partially removed, and the wall 30 must be repaired later the replacement. The cost of such a replacement is too high to be acceptable and the time is wasted.

SUMMARY OF THE INVENTION

The primary object of the present invention is to provide an improved check valve for use in a pressure balance faucet whose worn out parts can be easily and quickly replaced without structural damage of the wall around the fixed faucet.

Another object of the present invention is to provide an improved check valve for use in a pressure balance faucet wherein the check valve can effectively stop reverse flow of hot or cold water by way of a spring biased valve rod which can seal a stop hole of a sleeve of the check valve.

DETAILED DESCRIPTION OF THE PREFERRED EMBODIMENT

Figure 1:
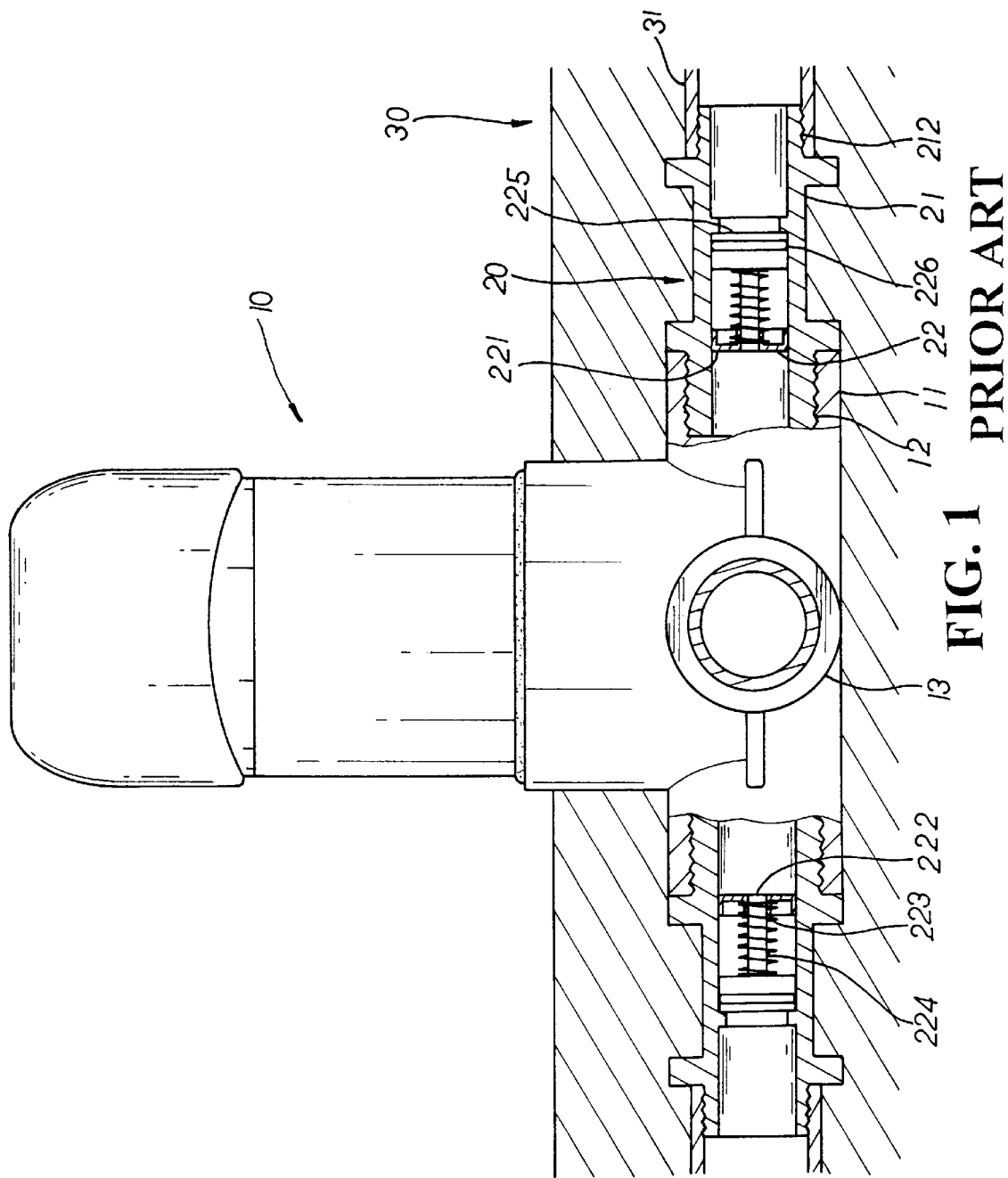
FIG. 1 is a sectional diagram showing the assembly of a prior art.
Figure 2:
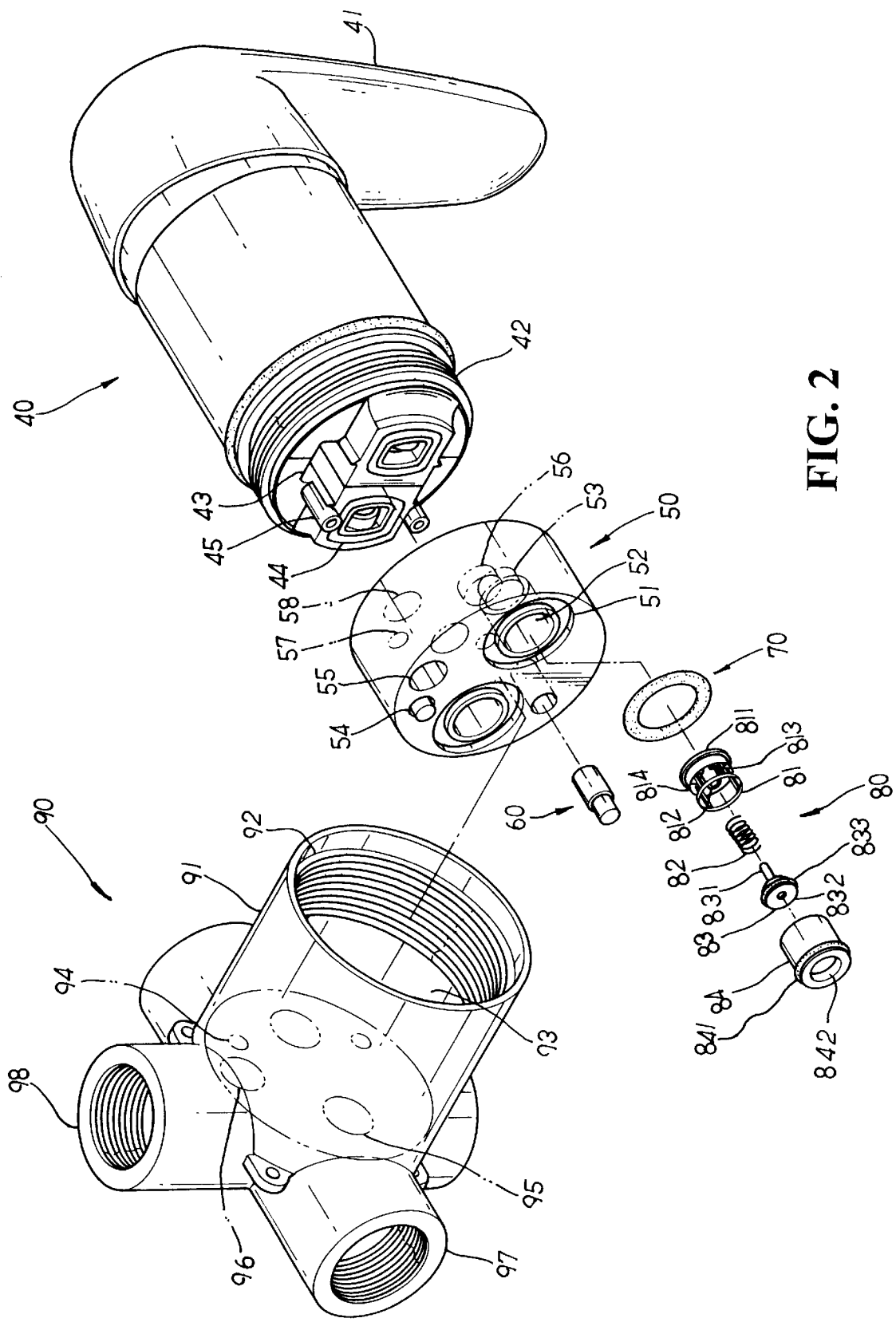
FIG. 2 is a perspective diagram showing the exploded components of the present invention.

Referring to FIG. 2, the present invention is made up of a control valve body 40, a check valve block 50, a pair of positioning pins 60, two seal rings 70, a pair check valve sets and a valve mount 90.

The control valve body 40 has a control handle 41 at one end and the other end is provided with an externally threaded junction 42 in which a pair of symmetric cold/hot water mixing outlet 43 are defined at the upper and lower position thereof. In communication with the cold/hot water mixing outlet 43 are disposed cold/hot water inlets 44. To the left side of the center line of the mixing outlet 43 are disposed retaining columns 45 at the upper and lower portion.

The check valve block 50 is provided with a pair of ring recesses 51 at the front side thereof with a pivot retaining hole 52 of a proper depth defined at the center of each ring recesses 51. A smaller limiting through hole 53 is in communication with each retaining hole 52. At the front side of the check valve block 50 are also disposed a pair of retaining cavities 54 each located at the summit and bottom of the left ring recess 51. At the rear side of the check valve block 50 is disposed a water outlet 55. There are two water inlets 56 disposed on the rear side and communicating with the pivot retaining hole 52 and the limiting through hole 53. The water inlets 56 operate in match with the cold/hot water inlets 44 of the control valve body 40. On the rear side and to the left portion thereof are disposed a pair of symmetric retaining holes 57 of a proper depth which match in position with the retaining columns 45 of the control valve body 40. A water outlet 58 is located at the upper portion of the rear side of the control valve body 40 and matches in position with the mixing outlet 43 of the control valve body 40.

The positioning pins 60 are a two-staged rod. The seal ring 70 is fit to the ring recesses 51 of the check valve block 50. Each check valve set 80 is made up of a sleeve mount 81, a spring 82, a valve stick 83 and a sleeve 84. The sleeve mount 81 is a hollow tube with a stop flange 811 of a proper size at one end having a central through hole 812 for the passage of the distal end of the valve stick 83. A plurality of axial ribs 813 are disposed around the central through hole 812 with a small retaining section 814 extending at the end of the sleeve mount 81. The spring 82 is registered with the central through hole 812 and the valve stick 83 which has an axially extended rod 831 and an abutment disc 832. A seal ring 833 is attached to the abutment disc 832.

At the front end of the sleeve 84 is disposed a sealing section 841 and a closure hole 842 of a smaller diameter for the limiting of the abutment disc 832 of the valve stick 83. At the opposite end of the sleeve 84 is disposed a snap means (not shown) in correspondence to the retaining section 814 of the sleeve mount 81. The valve mount 90 has an extended duct 91 at the front with an internally threaded section 92 and a receiving interior 93 in the duct 91 for housing the check valve block 50. On the inner end wall of the receiving interior 93 is defined a pair of positioning holes 94 in alignment with the retaining cavities 54 of the check valve block 50 and a pair of cold and hot water inlet holes 95 are located at the central portion of the end wall in match with the pivot retaining holes 52 of the check valve block 50. At the summit of the round inner end wall is disposed a cold and hot mixing water outlet hole 96 in alignment with the water outlet 58 of the check valve block 50. To each side of the extended duct 91 are symmetrically disposed a horizontal cold and hot water inlet duct 97 which are in communication with the cold and hot water inlet holes 95 respectively. To the upper and lower side of the extended duct 91 are connected a cold and hot mixing water connecting duct 98 both in communication with the cold and hot mixing water outlet hole 96.

Figure 3:
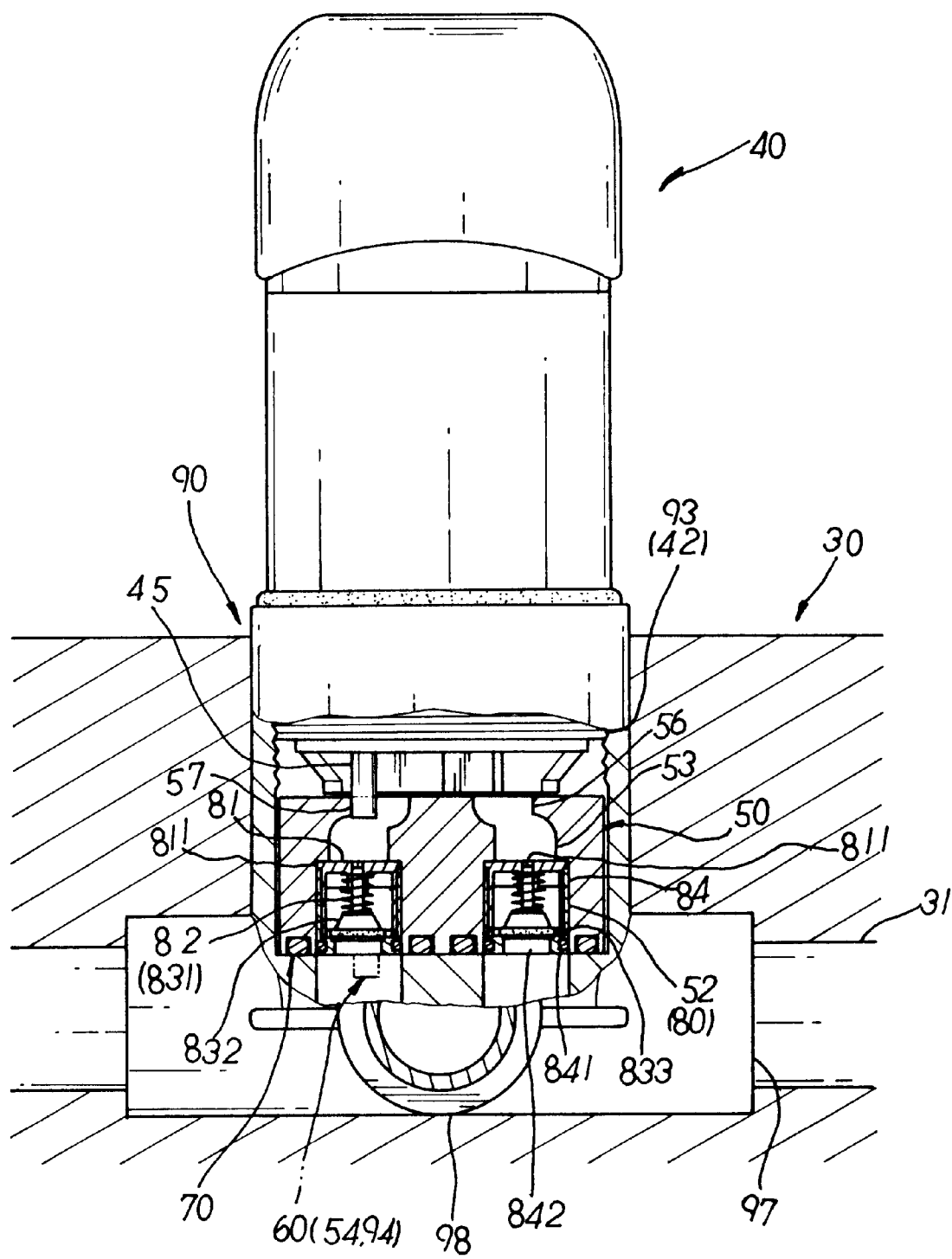
FIG. 3 is a sectional diagram showing the assembly of the present invention.

Referring to FIG. 3, in the assembly, the spring 82 of each check valve set 80 is engaged with the rod 831 of the valve stick 83 and the end of the rod 831 is registered with the through hole 812 of the sleeve mount 81. At then the spring 82 abuts against the axial ribs 813 of the sleeve mount 81 and is retained between the valve stick 83 and the sleeve mount 81. Afterwards, the sleeve 84 is tightly registered with the retaining section 814 of the sleeve mount 81 with the end of the sleeve 84 in sealing contact against the abutment flange 811 of the sleeve mount 81. Accordingly, the abutment disc 832 of the valve stick 83 and the seal ring 833 are retained in the retaining hole 842 of the sleeve 84. Next, the assembled check valve sets 80 are respectively housed in the pivot retaining hole 52 of the check valve block 50 and are pushed against the end surface of the limiting through hole 53.

The sealing section 841 of the sleeve 84 is in sealing engagement with the pivot retaining hole 52 respectively. Afterwards, the positioning pins 60 are respectively housed in the retaining cavities 54 and the seal rings 70 are placed in the ring recessed cavities 51 of the check valve block 50 which is then registered with the extended duct 91 of the valve mount 90. The positioning pins 60 disposed on the check valve block 50 are engaged with the positioning holes 94 of the receiving interior 93 of the valve mount 90 after the check valve block 50 is located in place. Then the control valve body 40 is locked to the valve mount 90 by way of the externally threaded junction 42 of the valve body 40 and the internally threaded section 92 of the valve mount 90. The two retaining columns 45 of the control valve body 40 register with the two retaining holes 57 of the check valve block 50. Then the cold and hot water pipes 31 are coupled to the cold and hot water inlet duct 97 of the valve body 90. To the upper or lower connecting duct 98 of the valve body 90 are respectively coupled a shower head and a faucet. Finally, the cold and hot water inlet ducts 97 and the control valve body 40 are covered by concrete in the wall 30 to complete the installation.

Figure 4:
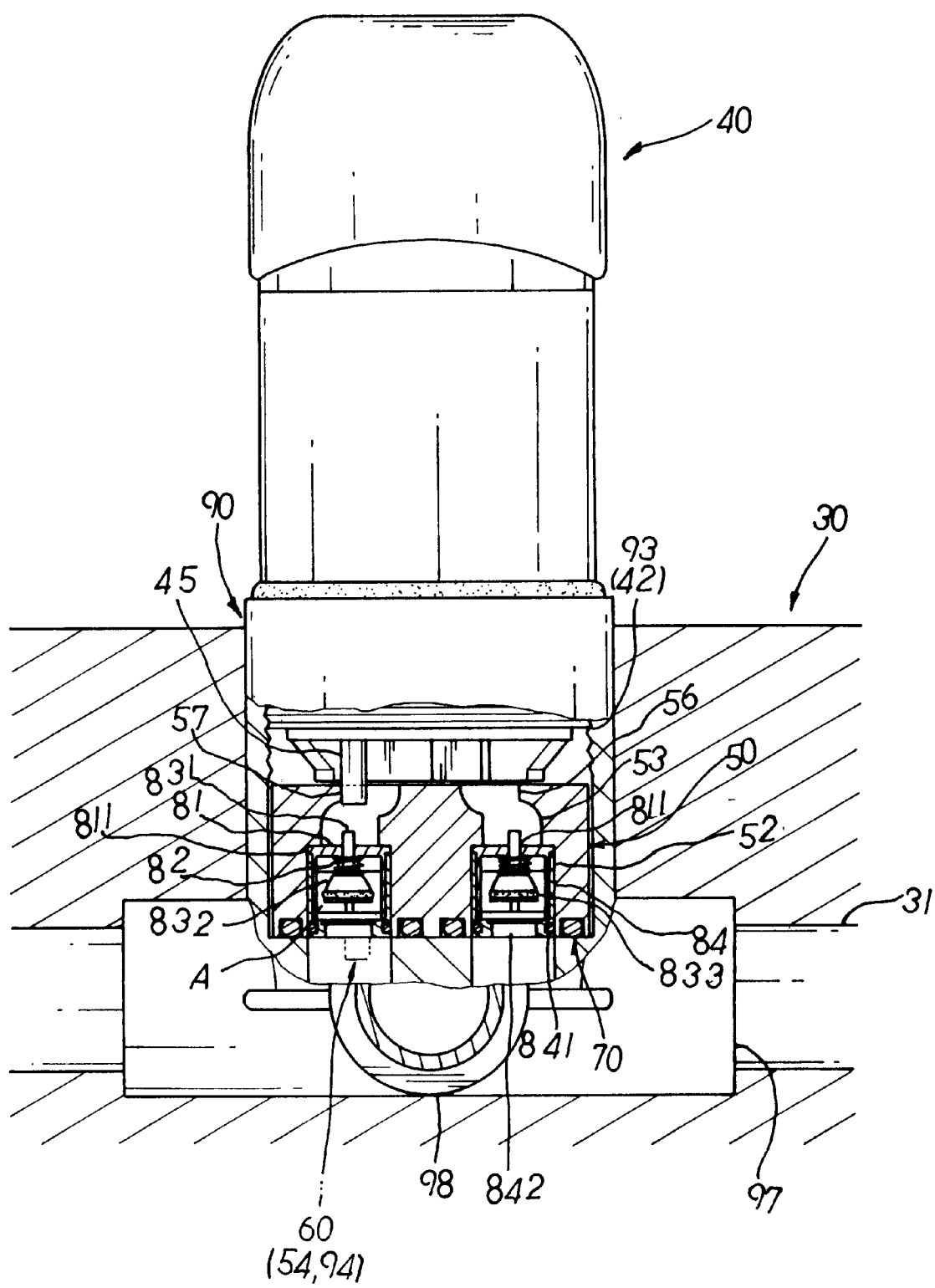
FIG. 4 is a diagram showing the operation mode of the present invention.

Referring to FIG. 4, as the control handle 41 of the control valve body 40 is set in the cold/hot water mixture position, cold and hot water are respectively led into the cold and hot water inlet duct 97 of the valve body 90 via the cold and hot water connecting pipe 31 and flow further via the cold and hot water inlet holes 95 of the valve mount receiving interior 93 of the valve body 90. At then, the cold and hot water respectively push the rods 831 of the valve stick 83 of the two check valve sets 80 fixed to the retaining holes 52 of the valve block 50 to move against the springs 82 and stick out of the through holes 812 of the sleeve mount 81. Accordingly, the abutment disc 832 of each valve stick 83 will lean against the surface around the through hole 812 of each sleeve mount 81. At then, the seal ring 833 on the abutment disc 832 of each valve stick 83 separates from the closure hole 842 of the sleeve 84 so as to produce an opened space A to permit cold and hot water to flow out of the opened space A. Subject to the flush of the cold and hot water, the sleeve mount 81 is forced to rotate by the flush-in cold and hot water respectively and helps the cold and hot water speedily flow through the ribs 813 separately into the cold and hot water inlets 44 of the control valve body 40. After the cold and hot water are intermixed in whirlpool in the control valve body 40 and are discharged via the cold and hot water outlets 43, it further flows into the water outlet 55 of the check valve block 50 via the water outlet 58 and discharges via the cold and hot mixing water outlet 96 of the valve body 90. Moreover, the discharged water is controlled by a user to flow out of the upper or lower connecting duct 98 of the valve body 90. So, once the cold and hot water produce a reverse flow in the sleeve mount 81, the valve stick 83 is subject to the force of the spring 82 and the reversed flow of the cold and hot water, resulting in the abutment disc 832 of the valve stick 83 to be forced against the closure hole 842 of the sleeve 84. At the same time, the seal ring 833 of the valve stick 83 can effectively prevent cold and hot water from flowing reversely whereby the cold and water pressures can be kept in balance with the temperature thereof kept constant.

I claim:

1. A check valve for use in a pressure balance faucet, comprising:

a control valve body, a check valve block, a pair of positioning pins, two seal rings, a pair check valve sets and a valve mount; wherein:

said control valve body has a control handle at one end and the other end is provided with an externally threaded junction in which a cold/hot water mixing outlet are defined at an upper and a lower position thereof respectively; in communication with said cold/hot water mixing outlet are disposed cold/hot water inlets; said valve mount has an extended duct at a front with an internally threaded section and a receiving interior in said duct for housing said check valve block; on an inner end wall of said receiving interior is defined a pair of positioning holes in alignment with retaining cavities of said check valve block and a pair of cold and hot water inlet holes are located at the central portion of said end wall in match with pivot retaining holes of said check valve block; at the summit of said round inner end wall is disposed a cold and hot mixing water outlet hole in alignment with a water outlet of said check valve block; to each side of said extended duct are symmetrically disposed a horizontal cold and hot water inlet duct which are in communication with the cold and hot water inlet holes respectively; to the upper and lower side of said extended duct are connected a cold and hot mixing water connecting duct both in communication with said cold and hot mixing water outlet hole; wherein the improvement is characterized in that:

to a left side of a center line of said mixing outlet are disposed a retaining column at an upper and lower position thereof;

said check valve block is provided with a pair of symmetric ring recesses at a front side thereof with a pivot retaining hole of a proper depth defined at a center of each said ring recess; a smaller limiting through hole is in communication with each said pivot retaining hole; at said front side of said check valve block are also disposed a pair of retaining cavities each located at a summit and bottom position of a left one said ring recesses; at a rear side of said check valve block is disposed a water outlet; there are two water inlets disposed on said rear side and communicating with said pivot retaining hole and said limiting through hole; said water inlets operate in match with said cold/hot water inlets of said control valve body; on said rear side and to a left portion thereof are disposed a pair of symmetric retaining holes of a proper depth which match in position with said retaining columns of said control valve body; a water outlet is located at the upper portion of said rear side of said control valve body and matches in position with said mixing outlet of said control valve body;

said positioning pins are a two-staged rod respectively;

said seal ring is fit to said ring recesses of said check valve block; each check valve set is made up of a sleeve mount, a spring, a valve stick and a sleeve; said sleeve mount is a hollow tube with a stop flange of a proper size at one end having a central through hole for the passage of a distal end of said valve stick; a plurality of axial ribs are disposed around said central through hole with a small retaining section extending at the end of said sleeve mount; said spring is registered with said central through hole and said valve stick which has an axially extended rod and an abutment disc; said seal ring is attached to said abutment disc; at a front end of said sleeve is disposed a sealing section and a closure hole of a smaller diameter for the limiting of said abutment disc of said valve stick; at the opposite end of said sleeve is disposed a snap means in correspondence to said retaining section of said sleeve mount; said valve mount has an extended duct at the front with an internally threaded section and a receiving interior in said duct for housing said check valve block; on the inner end wall of said receiving interior is defined a pair of positioning holes in alignment with said retaining cavities of said check valve block and a pair of cold and hot water inlet holes are located at the central portion of said end wall in match with said pivot retaining holes of said check valve block; at a summit of said round inner end wall is disposed a cold and hot mixing water outlet hole in alignment with said water outlet of said check valve block; to each side of said extended duct are symmetrically disposed a horizontal cold and hot water inlet duct which are in communication with said cold and hot water inlet holes respectively; to an upper and lower side of said extended duct are connected a cold and hot mixing water connecting duct both in communication with said cold and hot mixing water outlet hole.

\* \* \* \* \*